US 6,478,516 B2

(12) United States Patent
Hatley et al.

(10) Patent No.: US 6,478,516 B2
(45) Date of Patent: Nov. 12, 2002

(54) STATOR BAR INSULATION STRIPPING MACHINE AND METHOD

(75) Inventors: Kenneth John Hatley, Madison, NJ (US); Richard Michael Hatley, Madison, NJ (US); Charles James Marino, Sloansville, NY (US)

(73) Assignee: General Electric Company, Schenectady, NY (US)

( * ) Notice: Subject to any disclaimer, the term of this patent is extended or adjusted under 35 U.S.C. 154(b) by 165 days.

(21) Appl. No.: 09/753,721

(22) Filed: Jan. 4, 2001

(65) Prior Publication Data

US 2002/0083808 A1 Jul. 4, 2002

(51) Int. Cl.[7] .............................. B23C 3/00; B23Q 15/12
(52) U.S. Cl. ....................... 409/132; 409/180; 409/182; 409/186; 409/188; 409/193; 409/195
(58) Field of Search ................................. 409/175, 176, 409/180, 182, 186, 188, 195, 131, 132, 117, 218, 207, 208, 193; 81/9.51; 144/154.5; 29/597, 564.4, 33 R; 299/1.5

(56) References Cited

U.S. PATENT DOCUMENTS

| | | | | |
|---|---|---|---|---|
| 2,837,973 A | * | 6/1958 | Dunlap | 15/93.1 |
| 3,741,071 A | * | 6/1973 | Hoglund | 409/195 |
| 3,991,651 A | * | 11/1976 | Klena | 409/117 |
| 4,352,305 A | * | 10/1982 | Rodenbeck | 81/9.51 |
| 4,417,835 A | * | 11/1983 | Lund | 144/117.3 |
| 4,678,236 A | * | 7/1987 | Wirtgen | 299/1.5 |
| 5,028,179 A | * | 7/1991 | Grasset | 144/154.5 |
| 5,262,594 A | * | 11/1993 | Edwin et al. | 174/254 |
| 6,140,732 A | * | 10/2000 | Morimoto et al. | 29/597 |
| 6,161,761 A | * | 12/2000 | Ghaem et al. | 235/380 |

FOREIGN PATENT DOCUMENTS

EP              503325         *    9/1992    ............ 29/33 R

* cited by examiner

*Primary Examiner*—William Briggs
(74) *Attorney, Agent, or Firm*—Nixon & Vanderhye PC

(57) ABSTRACT

A machine is provided for stripping the ground wall insulation from a stator bar quickly and in such a manner that the copper strands will not be damaged. The apparatus of the invention includes a power driven cutting tool for milling or routing the insulation from a portion of the insulated bar, a sensing device for detecting the location of the copper strands and a height adjustment assembly for determining a disposition of the bar with respect to the cutting tool. In an exemplary embodiment, the height adjustment assembly is adjusted in accordance with the location of the copper strands as detected by the sensing device to substantially prevent the cutting tool from making damaging contact with the copper strands.

18 Claims, 6 Drawing Sheets

STATOR BAR INSULATION STRIPPING MACHINE AND METHOD

BACKGROUND OF THE INVENTION

The present invention relates to a machine and method for mechanically stripping the insulation from an insulated stator bar without damage to the copper strands of the bar, so that the bar can be reinsulated for use in a stator winding.

During the factory production of stator bars, occasionally a stator bar is rejected because the cross-sectional dimensions of the insulated bar are out of prescribed tolerance limits or because it fails at the electrical proof test. Occasionally, in generators in power plants, the stator bar insulation fails in service or during electrical tests, making the bar unsuitable for continued service. In these instances, the lead time required to manufacture a replacement bar starting from raw materials is long and is unacceptable for meeting the schedule for shipment of a new generator from the factory or for returning the generator to service. Accordingly, conventionally, the ground wall insulation from the rejected and/or failed bar is stripped down to the bare bar and the bar is reinsulated for assembly in the stator.

Conventionally, the insulation is stripped manually, using hand tools. This method is slow and has the potential for damaging the copper strands of the bar, rendering it unsuitable for reuse.

BRIEF SUMMARY OF THE INVENTION

The present invention provides a machine and method for stripping the ground wall insulation from a stator bar quickly and in such a manner that the copper strands will not be damaged. The apparatus of the invention includes a power driven cutting tool for milling or routing the insulation from a portion of the insulated bar, a sensing device for detecting the location of the copper strands and a height adjustment assembly for determining a disposition of the bar with respect to the cutting tool. In an exemplary embodiment, the height adjustment assembly is adjusted in accordance with the location of the copper strands as detected by the sensing device to substantially prevent the cutting tool from making damaging contact with the copper strands.

In an exemplary embodiment, the machine or apparatus is mounted to an insulated stator bar to be stripped and is driven longitudinally of the stator bar to cut the insulation along the length of the stator bar.

Accordingly, the invention is embodied in a stator bar stripping machine for removing insulation from a portion of an insulated stator bar, that comprises a power driven tool, including a cutter for milling the insulation from a portion of the insulated stator bar; a housing for at least partly enclosing the power driven tool; a support assembly for supporting the housing with respect to the stator bar; a sensing device for detecting a location of copper strands of the stator bar; and an adjusting mechanism for adjusting a disposition of the housing with respect to the stator bar so as to adjust a cutting depth of the power driven tool into a surface of the stator bar.

In an alternate embodiment of the invention, first and second power driven cutting tools are provided for simultaneously cutting spaced portions of the insulating material to thereby facilitate removal of the insulation from the copper strands following a single pass with the machine.

The invention is further embodied in a method of stripping insulation from a stator bar that comprises providing an insulation stripping machine including a power driven tool generally as described above, mounting the stripping machine to a stator bar by receiving the stator bar into the housing; and actuating the power driven tool to mill insulation from a portion of the insulated stator bar.

BRIEF DESCRIPTION OF THE DRAWINGS

These as well as other objects and advantages of this invention will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
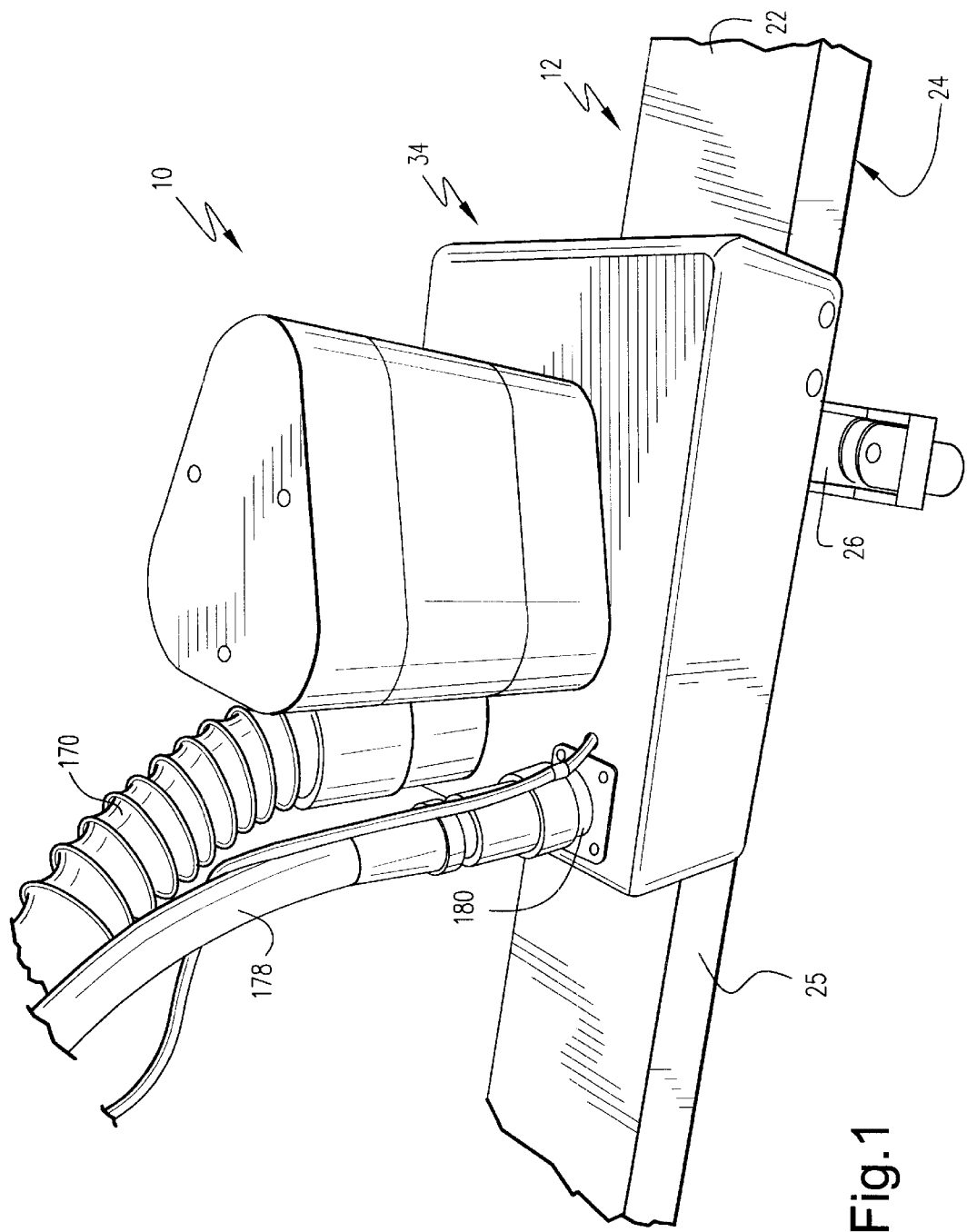
FIG. 1 is a rear left perspective view from above of an insulation stripping machine embodying the invention.

An insulation stripping machine 10 provided as an embodiment of the invention is schematically shown in FIG. 1. In the illustrated embodiment, the machine is provided as a self contained unit that is mounted to the stator bar 12 and is driven along the bar to sever a portion of the insulation disposed on the outer periphery of the bar. Thus, in a preferred embodiment, a support assembly is provided for supporting the stripping machine upright on the stator bar. Furthermore, in the presently preferred embodiment, the stripping machine is driven longitudinally of the stator bar to cut the insulation along the length of the stator bar. Accordingly, in the presently preferred embodiment, the support assembly includes a driving mechanism for driving the stripping machine relative to the stator bar.

Figure 5:
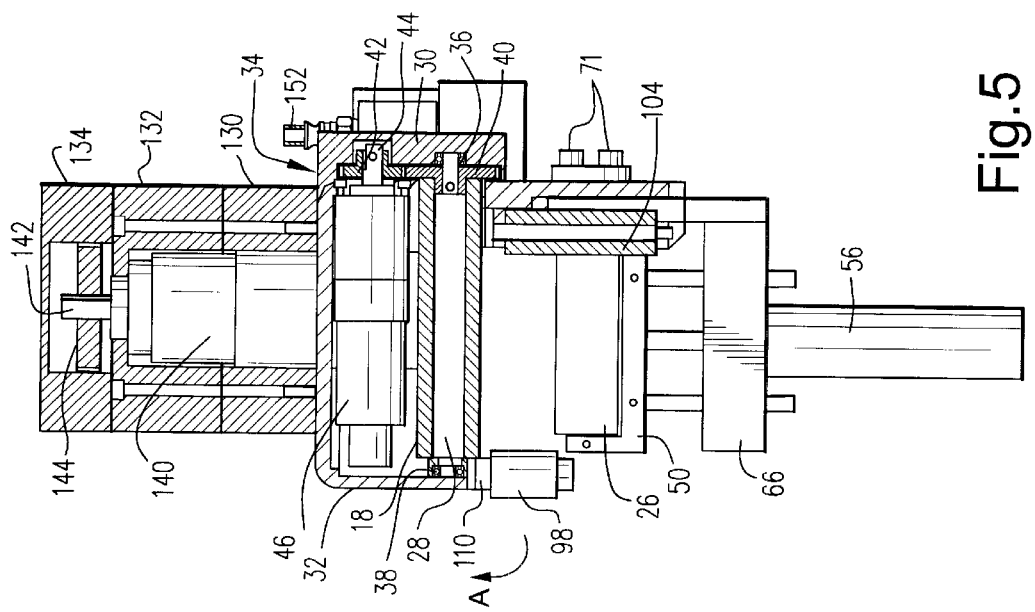
FIG. 5 is a rear elevational view of the stripping machine, partly in cross-section.
Figure 4:
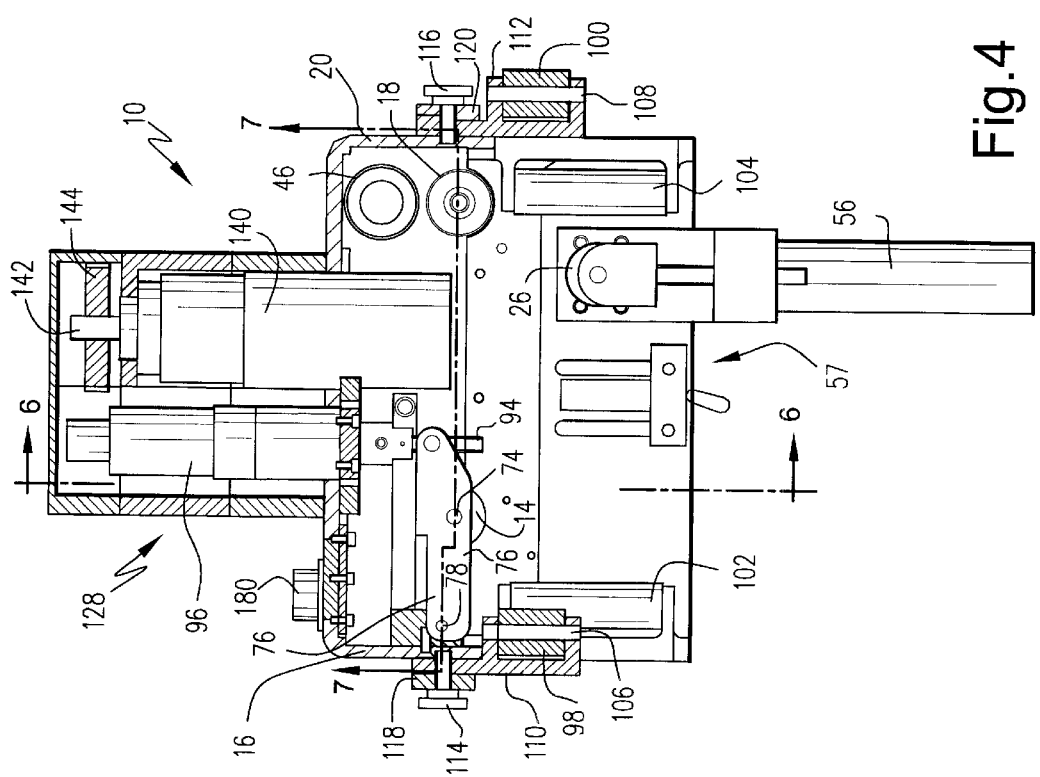
FIG. 4 is a left side elevational view, partly in cross-section, showing the height adjustment mechanism, sensor device and support assembly of the stripping machine.
Figure 6:
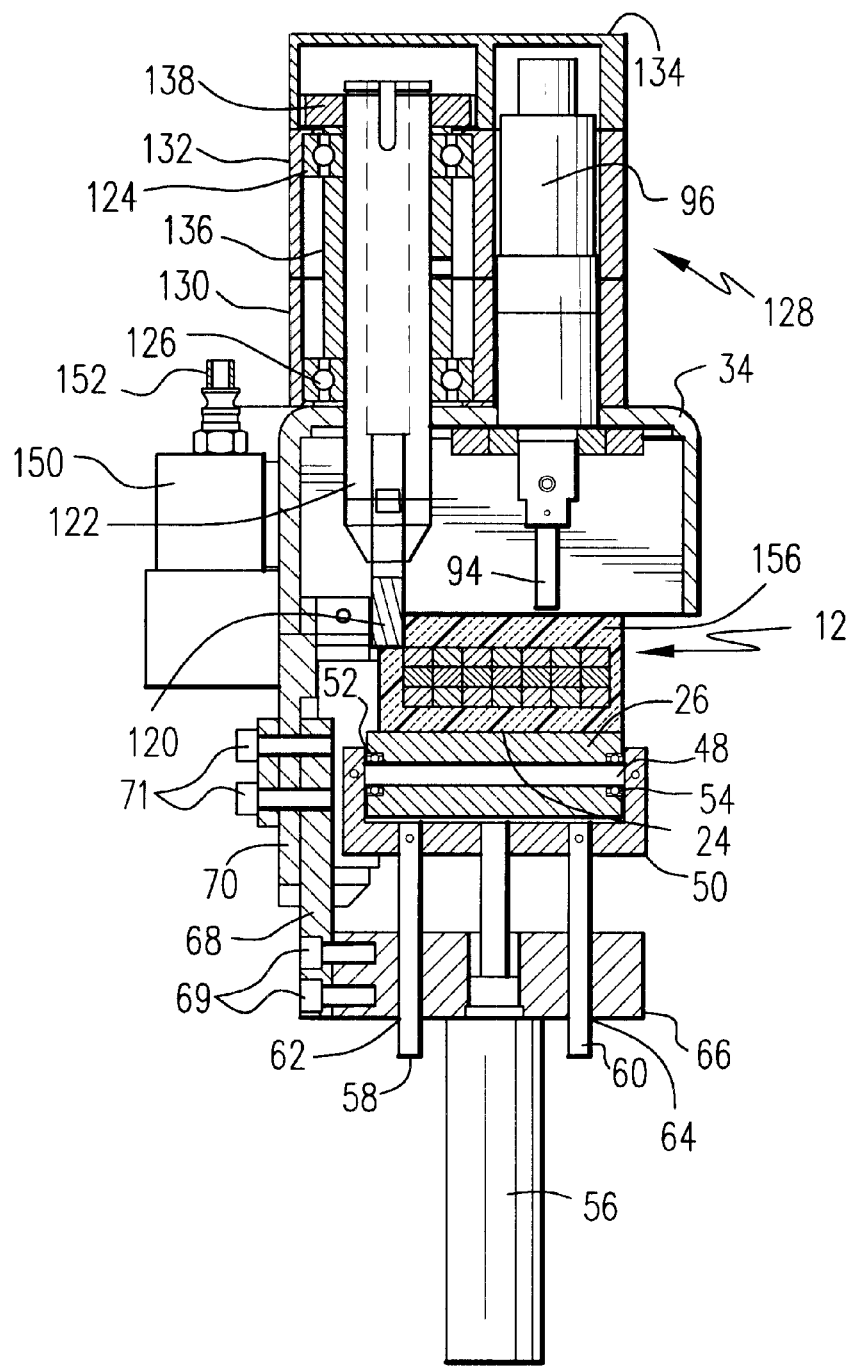
FIG. 6 is a front elevational view of the stripping machine, partly in cross-section and with some parts omitted for clarity.

The support assembly of the invention can be best be seen in FIGS. 4–6. The stripping machine 10 is desirably supported with respect to the upper and lower surfaces of the associated stator bar 12. In the illustrated embodiment, a pivot link roller 14 is disposed adjacent the leading end or forward end wall 16 of the stripping machine and a drive roller 18 is disposed adjacent the rearward end wall 20 of the stripping machine 10. Each of the pivot link roller 14 and drive roller 18 engage the upper flat surface 22 of the stator bar 12. The bottom surface 24 of the stator bar is engaged by a bottom roller 26. As can be appreciated, because the stripping machine 10 is adapted to be driven along the length of the stator bar and because the bulk of the weight of the stripping machine is disposed in the top portion of the stripping machine, the stripping machine essentially rests on the pivot link roller 14 and drive roller 18 and is clamped with respect to the bar by the bottom roller 26.

The drive roller 18 is mounted to a drive roller shaft 28 and supported with respect to side cover 30 and side wall 32 of the stripping machine housing main body 34 with suitable bearing structures 36,38 at each longitudinal end thereof as shown in FIG. 5. At one end of the drive roller shaft, a drive roller gear 40 is provided for meshing with a motor gear 42 mounted to the shaft 44 of the drive motor 46 disposed in parallel to the drive roller shaft 28. As shown in FIG. 5, in the illustrated embodiment, both the drive motor 46 and drive roller 18 are housed within the stripping machine housing main body 34.

Figure 3:
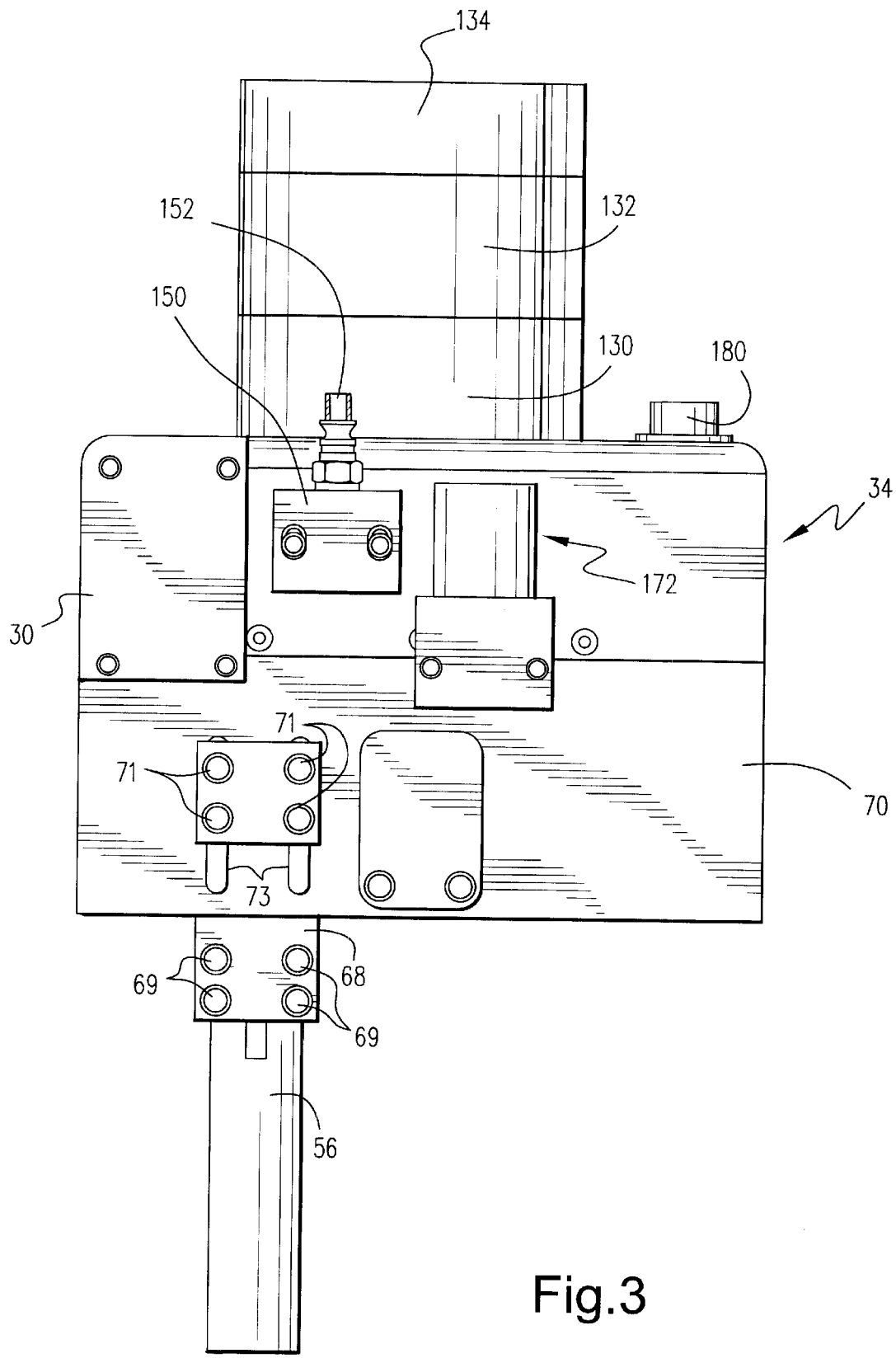
FIG. 3 is a right side elevational view of the stripping machine.

The bottom roller 26 is best seen and understood with reference to FIGS. 3, 5 and 6. The bottom roller is mounted to a bottom roller shaft 48 that is rotatably supported by a bottom roller mount 50. In the illustrated embodiment, the bottom roller shaft 48 is fixedly secured to the bottom roller mount 50 and the bottom roller 26 is rotatably mounted with respect to the bottom roller shaft by suitable bearings as shown at 52 and 54. It is to be understood that in the alternative, the bottom roller can be fixedly mounted to the bottom roller shaft and the bottom roller shaft rotatably mounted by the bearings to the bottom roller mount.

The bottom roller mount is positioned with respect to the stripping machine housing main body 34 with an air cylinder 56 that resiliently urges the bottom roller 26 to a bar engaging and elevating disposition to clamp the same against the drive roller and pivot link roller. As shown in FIG. 4, in the illustrated embodiment, a toggle valve/switch 57 is provided to activate the air cylinder 56.

The bottom roller is guided in its movement by guide shaft(s) 58,60 that are disposed through respective apertures 62,64 in the air cylinder mount 66. The air cylinder mount is secured to the housing main body 34 by a series of brackets and mounts. In the illustrated embodiment, a cylinder mount bracket 68 is secured to the cylinder mount 66 and to a depending sidewall 70 of the housing main body 34 via bolts 69 and 71, respectively. In the illustrated embodiment, the vertical position of the bottom roller 26 with respect to, e.g., the drive roller 18 is grossly adjusted by loosening bolts 71 and displacing the cylinder mount up or down with the bolts 71 sliding in slots 73 in side wall 70. This relative displacement facilitates insertion and removal of the stator bar, as described in greater detail below, but may not be necessary for bar 12 insertion.

Figure 7:
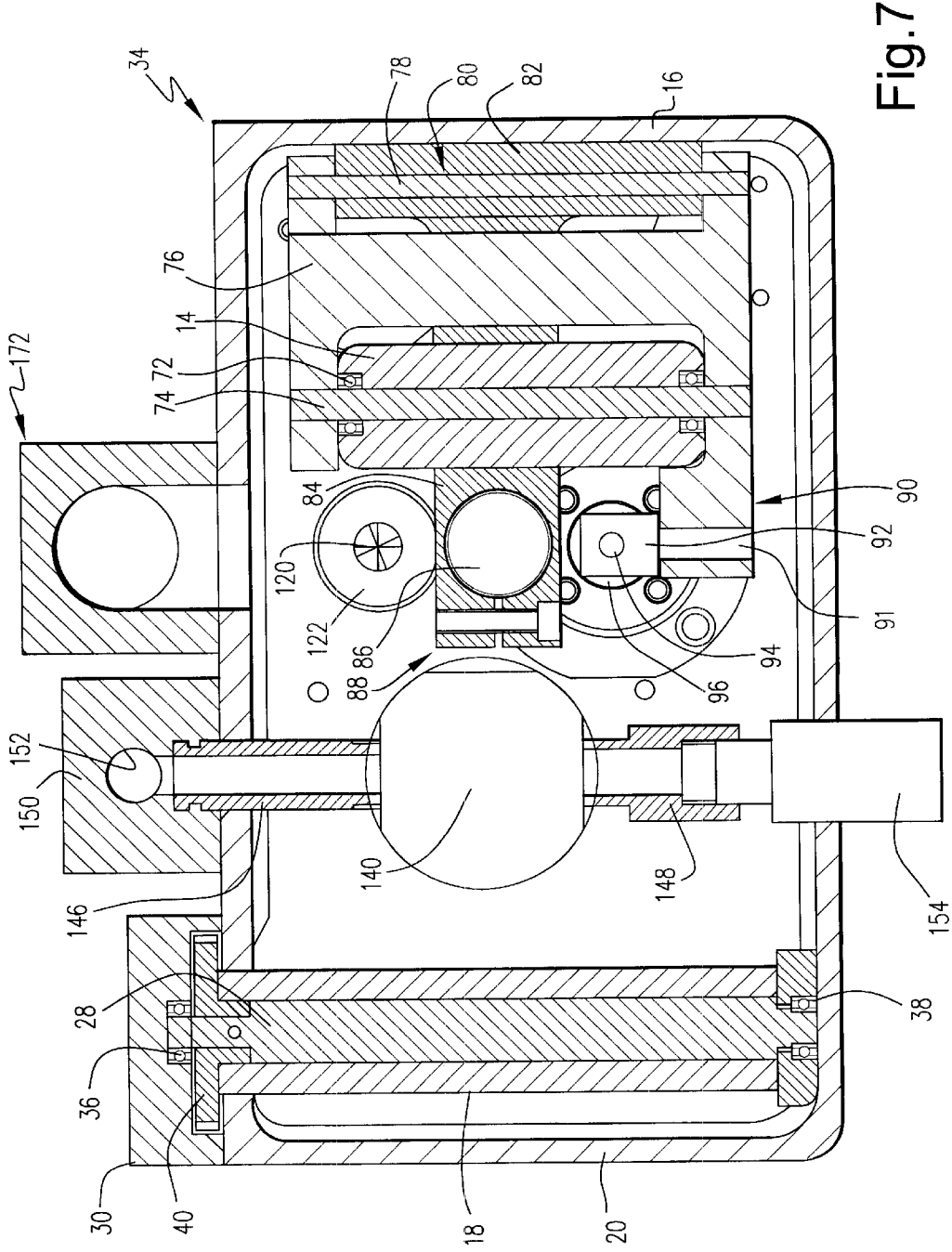
FIG. 7 is a view of the stripping machine taken generally along line 7—7 of FIG. 4, partly in cross section and with some parts omitted for clarity.

The pivot link roller 14 in the illustrated embodiment is rotatably mounted via suitable bearings 72 to a pivot roller shaft 74 that is fixedly secured to a pivot link 76, as best shown in FIG. 7. The pivot link is pivotally mounted via a pivot link shaft 78 to a sensor mount 80 that is secured to the front-end wall 16 of the housing main body 34. As illustrated in FIG. 7, the sensor mount 80 includes the transverse sensor mount portion 82 and a generally longitudinally extending sensor support 84. An inductive gauging sensor 86 is mounted to the rearward end of the sensor support 84 for being disposed in opposed facing relation to the stator bar 12 as described in greater detail below. In the illustrated embodiment, a bolt clamp assembly 88 is provided at the rearward end of the sensor support 84 for mounting and demounting, and controlling a vertical position of the sensor in the stripping machine. As will be understood from the fixed attachment of the sensor mount 80 to the forward wall 16 of the stripping machine, the sensor 86 mounted to the sensor support is fixedly disposed with respect to the stripping machine housing main body 34.

The pivot link 76 further includes a rearwardly projecting adjustment assembly 90 including a screw block 92 for threadably engaging the screw thread defined on the shaft 94 of a height adjustment motor 96 as described in greater detail below. In the illustrated embodiment, actuation of the height adjustment motor rotates its threaded shaft which is engaged with threaded block 92, which will in turn move upwardly or downwardly relative to the threaded shaft. The screw adjuster block 92 is rotatably or pivotally attached, as by shaft 91, to the rearward projecting portion 90 of the pivot link 76. Thus, actuation of the height adjustment mechanism will move the pivot link rearward end 90 upwardly or downwardly with respect to the pivot link shaft 78. Because the pivot link roller 14 is engaged with the upper surface 22 of the stator bar 12, relative downward movement of the pivot link roller 14 (part clockwise about shaft 78 in FIG. 4) will raise the forward end wall 16 of the stripping machine with respect to the top of the stator bar 12. Conversely, movement of the screw adjuster block 92 upwardly towards the motor 96 to raise the pivot link roller 14 (counter clockwise in FIG. 4) will lower the forward end wall 16 of the stripping machine with respect to the stator bar. Thus, by adjusting the height of the rearward end of the pivot link and in turn the height of the pivot link roller 14, a milling depth of the power driven cutting tool (described in greater detail below) with respect to the stator bar installation is adjusted. The inductive gauging sensor 86 detects the depth of the copper strands of the stator bar 12. Thus, depending upon the depth of the copper strands as detected by the inductive gauging sensor, the height adjusting motor 96 is actuated to raise or lower the pivot link 76 and roller 14 mounted thereto to respectively increase or decrease the cutting depth of the milling tool. This minimizes the risk of the copper strands being undesirably cut by the cutting tool during the milling operation.

To further support the stripping machine with respect to the stator bar, steady rollers 98,100 and side rollers 102,104 are preferably provided in accordance with an embodiment of the invention, although some or all of these rollers are omitted from some of the illustrations for clarity. As best shown in FIG. 4, the steady rollers 98,100 are rotatably mounted to respective shafts 106,108 of respective steadies 110,112. As can be seen from FIG. 5, in the presently preferred embodiment, the steadies are mounted to the front and rear walls 16,20 of the housing main body 34 to engage the left side wall 25 of the stator bar 12. By loosening the thumb screws 114,116 to release the steady clamp plates 118,120 and the steady 110,112 for movement relative to the housing main body front and rear walls 16,20, the steady rollers can be pivoted as shown by arrow A to a horizontal disposition so that the stator bar 12 can be laterally inserted and removed from the stripping machine (See, e.g., FIG. 6).

Thus, to mount the stator bar within the stripping machine, if necessary, bolts 71 are loosened and cylinder mount 66 is lowered to facilitate insertion of the bar 12. Further, the steady 110 mounted to the front end wall 16 is loosened with respect to the housing by loosening the thumb screw 114 and then rotating the steady through about 90 degrees so that it is projecting to the left side of the housing. Similarly, the steady 112 provided at the rear end of the stripping machine is loosened with respect to the rear end wall 20 by loosening the associated thumb screw 116 and then it too is rotated through about 90 degrees. The thumb screws 114,116 may be temporarily retightened to hold the steadies in their horizontal disposition.

The stator bar 12 may then be inserted until its right sidewall abuts the side rollers 102,104 provided adjacent at the forward and rearward ends of the stripping machine 10. Once the stator bar is abutted against the side rollers, the steady rollers are released by releasing their respective thumb screws 114,116 and pivoted or rotated to the configuration shown in FIG. 4 to engage the left side wall 25 of the stator bar 12. The air cylinder mount 66 is then lifted and bolts 71 tightened to clamp the stator bar within the housing main body 34. Thus, in the illustrated embodiment, the support assembly includes not only the pivot link roller 14, drive roller 18 and bottom roller 26, but also the steady rollers 98,100 and side rollers 102,104, so that the machine 10 is supported with respect to all four sides of the stator bar 12.

A power driven cutting tool is provided in accordance with the preferred embodiment of the invention for stripping the insulation from the stator bar. The insulation removing bit 121, which may be characterized as a router-type bit, is in the presently preferred embodiment a carbide end mill mounted to a suitable end mill holder 122 that is rotatably mounted via upper and lower bearings 124,126 within the motor housing 128. In the illustrated embodiment, the motor housing 128 is defined by a lower motor housing 130, an upper motor housing 132 and a motor housing cover 134. A bearing spacer 136 is disposed between the upper and lower bearings 124,126. In the illustrated embodiment, a spindle gear 138 is secured to the upper end of the end mill holder for being driven to drive the end mill holder.

In the presently preferred embodiment, a nose mount air gear motor 140 is provided for driving the end mill holder 122. The nose mount air gear motor can best be seen in FIGS. 4 and 5. A shaft 142 projects upwardly from the motor and has an air motor gear 144 fixedly secured thereto. The air motor gear meshes with the spindle gear 138 of the end mill holder 122 to translate rotation of the motor shaft 142 to rotation of the end mill holder 122 and in turn to rotation of the carbide end mill 121 for removing insulation from the stator bar 12. The end mill/end miller holder 121,122 and air motor 140 operatively coupled thereto thus together define, in an exemplary embodiment of the invention, a power driven tool for milling or routing the insulation from a portion of the insulated bar.

In FIG. 7 an air input tube 146 for the nose mount air gear motor 140, and an air exhaust tube 148 can be seen. More specifically, in the illustrated embodiment, an air input block 150 is mounted to the right side of the housing for coupling by nipple 152 to a suitable compressed air source. The compressed air is fed by air input tube 146 to the nose mount air gear motor 140. The air exhaust tube 148 is mounted to extend from the nose mount air gear motor 140 and is desirably provided with a muffler 154 (shown only in FIG. 7 for clarity).

In use, it may be desirable to actuate the carbide end mill 121 to rotate during lifting of the air cylinder 56 to clamp the machine 10 to the stator bar 14, to rout the stator bar insulation 156 to facilitate the full seating of the bar in the machine and to allow the subsequent longitudinal insulation removal following attachment of the stripping machine 10 to the stator bar 12.

Figure 2:
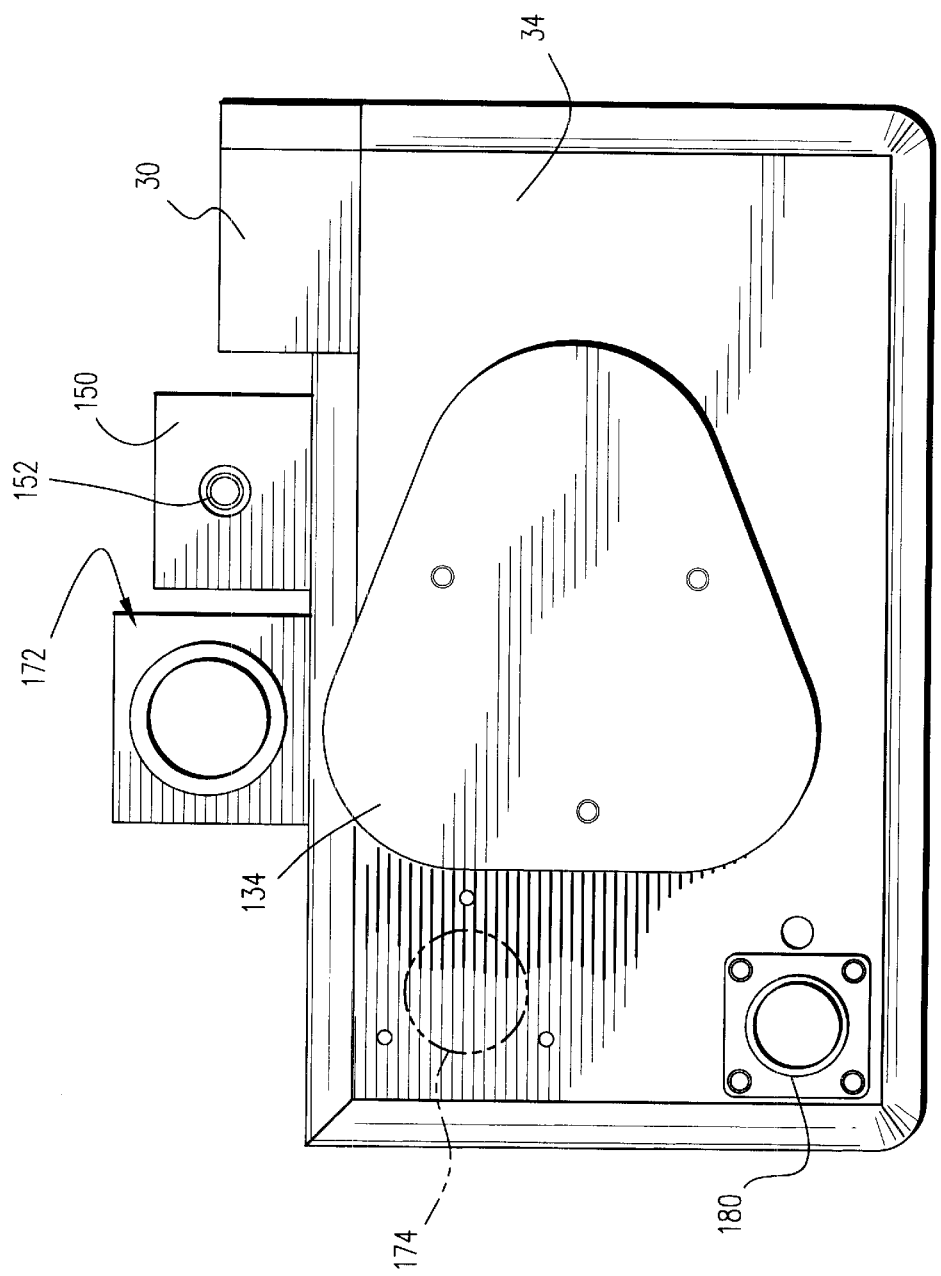
FIG. 2 is a top plan view of the stripping machine of FIG. 1, omitting the control line and vacuum line of FIG. 1.

A vacuum hose is further desirably attached to the housing to evacuate debris resulting from the milling of the stator bar 12 with the end mill 121. In the illustrated embodiment, a side vacuum port 172 is provided as best seen in FIGS. 2 and 7. In addition, or in the alternative, the vacuum port may be disposed on the housing main body 34 as shown in phantom lines at 174 in FIG. 2 and as illustrated by the vacuum tube 170 in the perspective view of FIG. 1.

As noted above, the inductive gauging sensor detects the location of the copper strands to determine the position of the stator bar relative to the power driven tool. Suitable computer feedback control based upon the depth of the copper strands detected by the inductive gauging sensor is achieved by a control cable 178 as shown in FIG. 1, attached in an exemplary embodiment to a 14 pin male receptacle 180. As disclosed herein above, the height adjustment motor in connection with the pivot link and pivot link roller 14 adjusts the position of the stripping machine with respect to the stator bar to determine the milling depth of the power driven end mill 121. By suitably programming the control system, once the distance of the copper strands from the sensor has been detected a suitable height adjustment can be determined to ensure that the milling cutter cuts substantially to but not into the copper strands of the insulated bar. Thus, in the presently preferred embodiment, the height adjustment mechanism is actuated in response to the copper strand position detected by the sensing device.

In the exemplary embodiment illustrated in FIGS. 4–7, a single milling cutter is provided for removing insulation to a depth as determined by the height adjustment mechanism and to a width determined by the width of the end mill 121 and its lateral position with respect to the stator bar. Thus, as shown for example in FIG. 6, because the milling cutter is laterally offset with respect to a vertical plane of symmetry of the stator bar, the milling cutter removes a corner of the insulation disposed on the stator bar. Thus, in order to remove the insulation from each of two corners of the stator bar to facilitate removal of the insulation from the stator bar, the machine is passed twice along the stator bar, once longitudinal from one end to the other and then longitudinally from the other end to the one end. After such milling/stripping passes, the insulation may be rather readily removed from the stator bar.

In an alternate embodiment of the invention (not shown) a second end mill is provided for cutting the opposite corner of the stator bar so that the insulation can be suitably stripped following a single pass of the stripping machine.

The motor is desirably centered with respect to the housing to provide a stripping machine that is weight balanced for mounting to the stator bar. Because the milling cutter is preferably laterally offset with respect to the center of the stator bar, the end mill holder is provided as a separate structure from the motor and laterally offset with respect thereto. For that reason, the longitudinally and laterally offset end mill holder and gear are provided in the illustrated embodiment, operatively coupled with the air motor gear as shown in FIGS. 4–6.

In use, once the machine is clamped on the bar, the downstream roller(s), more specifically, the drive roller, drives the machine down the bar. The height adjusting mechanism, more specifically, the leading roller (in the illustrated embodiment the pivot link roller) adjusts the disposition of the bar so that the end mill will travel down the bar at a predetermined distance above the determined surface of the copper strands and to a side thereof. In order to adjust the height adjusting mechanism to control the milling depth, the inductive distance gauge is used to read the position of the copper through the insulation. Knowing where the copper is allows the cutter height to be adjusted automatically to effect the desired milling operation.

A number of pneumatically operated stands (not shown) are desirably provided to support the bar while the cutting operation is in progress. Each of these stands is desirably provided with a sensor to sense the approach of the cutting machine so that the support may be retracted as necessary or desirable to allow the machine to pass.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator bar stripping machine for removing insulation from a portion of an insulated stator bar, comprising:
   a power driven tool including a cutter for milling the insulation from a portion of the insulated stator bar;
   a housing for at least partly enclosing said power driven tool;
   a support assembly for supporting said housing with respect to said stator bar;
   a sensing device for detecting, through said insulation, a location of copper strands of the stator bar; and
   an adjusting mechanism for adjusting a disposition of said housing with respect to the stator bar so as to adjust a cutting depth of said cutter into a surface of said stator bar.

2. A stator bar stripping machine as in claim 1, wherein said support assembly includes a bottom roller for engaging a bottom surface of said stator bar.

3. A stator bar stripping machine as in claim 2, further comprising a bottom roller mount for supporting said bottom roller with respect to said housing.

4. A stator bar stripping machine as in claim 3, further comprising an assembly for adjusting a height of said bottom roller.

5. A stator bar stripping machine as in claim 4, wherein said assembly includes an air cylinder for resiliently supporting said bottom roller.

6. A stator bar stripping machine as in claim 5, further comprising first and second guides for guiding vertical movement of said bottom roller.

7. A stator bar stripping machine as in claim 1, wherein said support assembly includes a plurality of side rollers for engaging side walls of said stator bar.

8. A stator bar stripping machine as in claim 7, wherein said side rollers include first and second side rollers fixedly disposed with respect to said housing and first and second steady rollers pivotally mounted to said housing for being pivoted from a vertical orientation in facing relation to a sidewall of the stator bar, to a horizontal disposition to permit insertion and removal of the stator bar from said housing.

9. A stator bar stripping machine as in claim 1, wherein said sensing device comprises an inductive gauging sensor for detecting a depth of said copper strands, said sensing device being operatively coupled to said adjusting mechanism.

10. A stator bar stripping machine as in claim 1, wherein said adjusting mechanism comprises a pivot link roller pivotally mounted to said housing and a height adjustment device fixedly secured to said housing for pivoting said pivot link with respect to said pivotal mounting to selectively raise and lower said housing with respect to a stator bar disposed therethrough in engagement with said pivot link roller.

11. A stator bar stripping machine as in claim 1, wherein said power driven tool comprises an end mill fixedly secured to an end mill holder rotatably mounted to said housing and a motor laterally offset with respect to said end mill holder and fixedly secured to said housing, said end mill holder and said motor being operatively coupled by a respective drive and driven gears.

12. A stator bar stripping machine as in claim 1, wherein said support assembly comprises a drive roller rotatably mounted to said housing and a drive motor disposed in parallel to said drive roller, said drive motor having a motor gear secured thereto for driving a drive roller gear of said drive roller.

13. A method of stripping insulation from a stator bar comprising:
   providing an insulation stripping machine including:
      a power driven tool including a cutter for milling the insulation from a portion of the insulated stator bar;
      a housing for at least partly enclosing said power driven tool;
      a support assembly for supporting said housing with respect to the insulated stator bar;
      a sensing device for detecting, through said insulation, a location of copper strands of the stator bar; and
      an adjusting mechanism for adjusting a disposition of said housing with respect to the stator bar so as to adjust a cutting depth of said cutter into a surface of said stator bar;
   mounting said stripping machine to a stator bar by receiving said stator bar into said housing; and
   actuating said power driven tool to mill insulation from a portion of the insulated stator bar.

14. A method as in claim 13, wherein said support assembly comprises a drive roller and a drive motor operatively coupled thereto and further comprising a step of actuating said drive motor for driving said drive roller to displace said stripping machine with respect to said stator bar.

15. A method as in claim 14, wherein said support assembly further includes a bottom roller for engaging a bottom surface of said stator bar, a bottom roller mount for supporting said bottom roller with respect to said housing, and an air cylinder for resiliently supporting said bottom roller mount, and further comprising the step of resiliently urging the stator bar against said drive roller with said bottom roller.

16. A method as in claim 15, further comprising guiding vertical movement of said bottom roller.

17. A method as in claim 13, wherein said support assembly includes a plurality of side rollers for engaging lateral sides of said stator bar, at least one of said side rollers being pivotably mounted to said housing, and wherein said step of mounting comprises pivoting said at least one side roller to a horizontal disposition to permit insertion and removal of the stator bar from said housing.

18. A method as in claim 13, wherein said sensing device comprises an inductive gauging sensor for detecting a depth of said copper strands and said sensing device is operatively coupled to said adjusting mechanism, and further comprising one of raising and lowering the power cutting tool with respect to the stator bar according to a depth of said copper strands detected by said sensor.

* * * * *